US008290728B2

(12) United States Patent
Drapkin et al.

(10) Patent No.: US 8,290,728 B2
(45) Date of Patent: Oct. 16, 2012

(54) METHOD AND APPARATUS FOR INTEGRATED CIRCUIT TEMPERATURE CONTROL

(75) Inventors: Oleg Drapkin, Richmond Hill (CA); Grigori Temkine, Markham (CA); Kristina Au, Richmond Hill (CA); Filipp Chekmazov, Toronto (CA); Paul Edelshteyn, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 726 days.

(21) Appl. No.: 12/338,228

(22) Filed: Dec. 18, 2008

(65) Prior Publication Data

US 2010/0161261 A1  Jun. 24, 2010

(51) Int. Cl.
*G01R 19/32* (2006.01)
*G06F 11/00* (2006.01)

(52) U.S. Cl. ............ 702/65; 702/64; 702/130; 702/132; 702/136; 324/750.28

(58) Field of Classification Search ..................... 702/65, 702/64, 130, 132, 136
See application file for complete search history.

(56) References Cited

U.S. PATENT DOCUMENTS

| | | | |
|---|---|---|---|
| 6,008,685 A * | 12/1999 | Kunst | 327/512 |
| 6,169,442 B1 * | 1/2001 | Meehan et al. | 327/513 |
| 6,736,540 B1 | 5/2004 | Sheehan et al. | |
| 6,869,216 B1 * | 3/2005 | Holloway et al. | 374/170 |
| 6,957,910 B1 * | 10/2005 | Wan et al. | 374/183 |
| 7,010,440 B1 * | 3/2006 | Lillis et al. | 702/65 |
| 7,758,240 B2 * | 7/2010 | Julio et al. | 374/178 |

OTHER PUBLICATIONS

Smith, Matt, "A Chip You Can Use to Monitor Environmental Conditions on PC Motherboard Designs," Analog Dialogue, Jan. 1999, pp. 44-48, vol. 33, No. 1, Analog Devices, Inc., United States.
Smith, Matt, "Measuring Temperatures on Computer Chips with Speed and Accuracy," Analog Dialogue, Apr. 1999, pp. 49-53, vol. 33, No. 4, Analog Devices, Inc., United States.

\* cited by examiner

*Primary Examiner* — Hal Wachsman
(74) *Attorney, Agent, or Firm* — Faegre Baker Daniels LLP

(57) ABSTRACT

A method includes generating a first, second and third voltage output from a temperature sensing element of an integrated circuit using a respective, corresponding first, second and third, switched current source, for sequentially switching a respective first, second and third excitation current through the temperature sensing element. The third switched current source generates the corresponding third voltage output as a reference voltage between the first voltage and the second voltage. An error corrected difference is calculated between the first voltage and the second voltage using the reference voltage. In the method, the second excitation current is proportional to the first excitation current by a value n, and the third excitation current is proportional to the first excitation current by the square root of n.

20 Claims, 6 Drawing Sheets

- PRIOR ART -

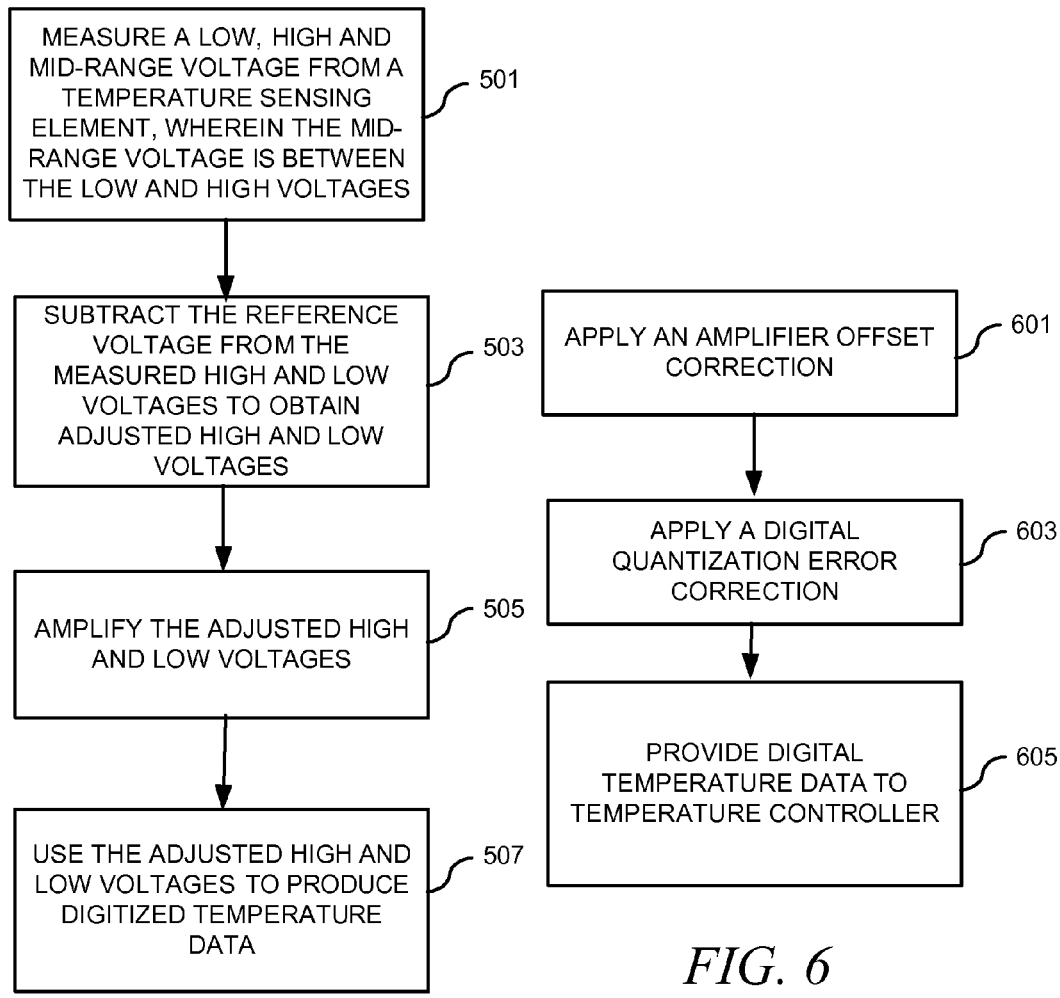

METHOD AND APPARATUS FOR INTEGRATED CIRCUIT TEMPERATURE CONTROL

FIELD OF THE DISCLOSURE

The present disclosure is related generally to integrated circuits, and more specifically to methods and apparatuses for managing heat dissipation and preventing heat damage to such integrated circuits.

BACKGROUND

Highly integrated chips, which may have hundreds of millions of transistors, dissipate significant amounts of power which may cause severe overheating leading to possible thermal run-away and chip damage. The situation may be even worse where different chip areas dissipate different amounts of power due to different performance modes of the chip areas. For example, the same local block could dissipate either significant amounts of power or small amounts of power at different times based on the performance mode applicable to the particular local block.

It is possible to avoid overheating for such different local areas if information about local over-heating conditions for the different areas at different times is accumulated and processed. To accomplish this, a certain number of thermo-sensors must be placed at different local areas of the chip, to monitor the local area's temperature. The thermo-sensors would also require a single digital block, acting as a temperature controller, that could process data received from the various thermo-sensors data, and make certain predetermined decisions, such as decreasing clock speed, decreasing voltage supply level, increasing fan rotations, shutting-down a temporarily over-heated block, etc., in order to avoid permanent damage to the chip.

Such on-chip thermo-sensors must be accurate, Process/Voltage/Temperature (PVT) independent, and not be a burden to on-chip routing resources. Further, accurate temperature measuring methodologies must be applied. Unfortunately, existing on-chip thermo-sensors and measurement methods are not accurate. While these existing measurements and methodologies are leakage and PVT dependable, they can not provide accurate enough temperature data to avoid chip damage that may occur during high core activity.

There are several known solutions that the integrated circuit industry has utilized in an attempt to avoid chip thermal run-away and the damage that may result. One such solution employs an external thermo-sensor that may be fixed, for example by glue, on top of chip to be monitored. While this solution provides integrated circuit package temperature data, it does not have the needed accuracy, increases the external component cost, and is too slow to reflect fast temperature changes due to significant chip/package thermo-capacitor values.

A second known solution, descriptions of which are found throughout the industry literature, employs two internal diodes. This solution provides a technique of measuring temperature by comparing the voltage difference for the two diodes at different current densities, and following this difference with amplification. This solution has advantages over the top-of-chip sensor approach in that it provides a way of obtaining temperature data for local areas of the chip. However, the solution still has several significant disadvantages. First, the solution requires too much chip routing resources to place the two diodes in the different local areas of the chip and provide the necessary connections with the central digital block. Second, significant errors exist due to mismatches between the two diodes. Further, the diode mismatch error will be magnified by amplifier offset error causing the solution to be even less accurate.

The most progressive existing solution utilizes a single diode and a sample-and-hold architecture. The sample-and-hold architecture makes it possible to use only a single diode to sample, hold, and compare the difference between two diode voltage levels, which are based on two different current levels that are sent through the single diode. This solution also requires two capacitors, and ΔVbe ADC 111, and associated processing logic as illustrated in FIG. 1. Although this solution uses two external capacitors, thereby increasing the cost by adding external components, it is possible to implement the solution with two internal capacitors instead.

Although using only a single diode eliminates the problems associated with diode mismatch, and also eliminates complicated routing problems, this solution still presents several disadvantages. First, the sample-and-hold architecture can not provide the needed accuracy due to the leakage vulnerability of the switches and capacitors involved. Leakage currents, which are difficult to avoid for such on-chip switches, will degrade the circuit's "hold" mode data.

Additionally, high leakage current temperature dependence and mismatch renders a higher leakage error at higher temperature. Amplifier offset error as well as quantization error also worsens the accuracy of this solution.

Therefore, what is needed are methods and apparatuses for measuring temperature increases at the local block level with the required accuracy, and providing responses to undesirable temperature levels quickly enough to avoid thermal induced damage to the chip.

BRIEF DESCRIPTION OF THE DRAWINGS

FIG. 5 is a flow chart of a method in accordance with the embodiments.

FIG. 6 is a flow chart providing additional operations that may be applied to the flow chart of FIG. 5 for some embodiments.

DETAILED DESCRIPTION

Figure 1:
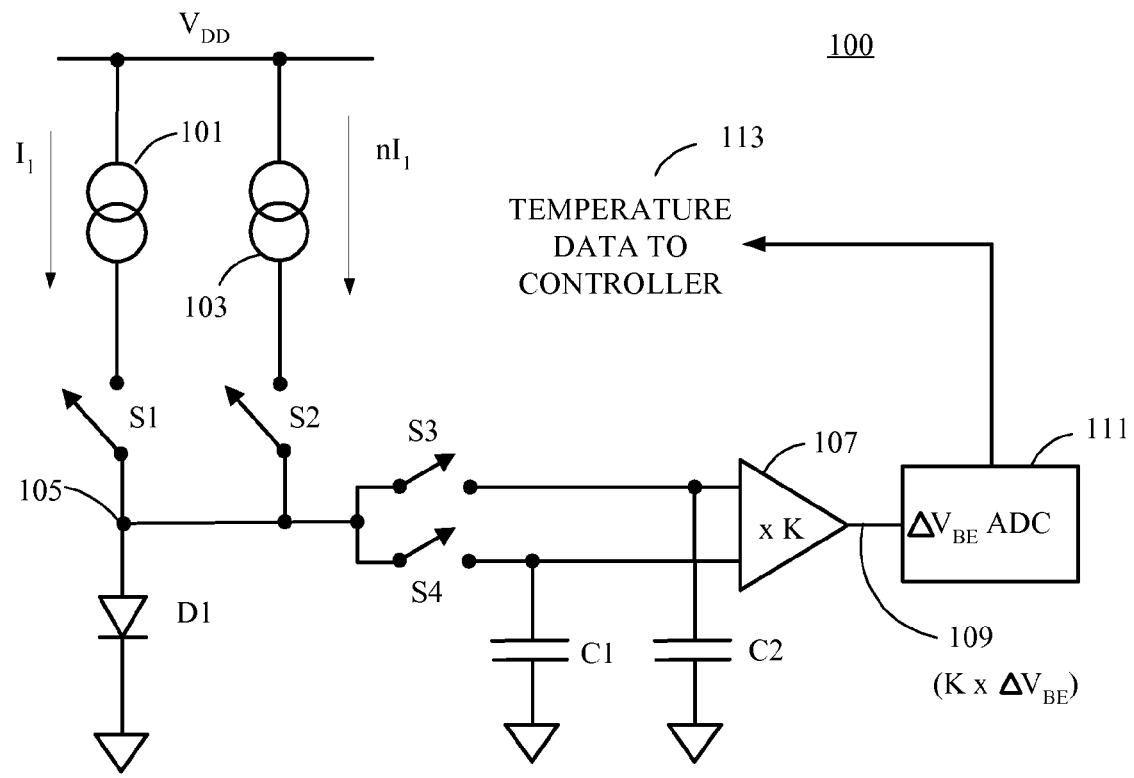
FIG. 1 is a schematic diagram of a prior art solution for monitoring temperature levels on a chip.

In accordance with the embodiments, a method and apparatus is disclosed wherein an integrated circuit die temperature may be monitored accurately for different local areas of the chip without the need for additional complicated circuit routing. The described embodiments avoid the accuracy problems associated with PVT and leakage dependency. The embodiments further compensate for system offset error, as well as quantization error, and do not suffer from amplifier offset inaccuracies, or issues due to limited dynamic range of amplifiers or ADCs.

The embodiments may be realized as an on-chip implementation or may be implemented in conjunction with external components. Further, many local areas of the chip may be monitored using the methods and apparatuses of the embodiments, by employing multiple diodes placed into local areas, with one diode per area of interest. The methods and apparatuses of the embodiments may also be utilized to monitor the temperature conditions of several external chips, by using appropriate external thermo-sensors (diodes).

A method herein disclosed includes generating a first, second and third voltage output from a temperature sensing element of an integrated circuit using a respective, corresponding first, second and third, switched current source, for sequentially switching a respective first, second and third excitation current through the temperature sensing element, wherein the third switched current source generates the corresponding third voltage output that will be maintained and used as a reference voltage between the first voltage and the second voltage during one cycle of temperature measurement; and calculating an error corrected difference between the first voltage and the second voltage using the reference voltage. In the method, the second excitation current is proportional to the first excitation current by a value n, and the third excitation current is proportional to the first excitation current by the square root of n.

An integrated circuit temperature sensing device herein disclosed includes at least one temperature sensing element positioned in an area of the integrated circuit; a first, second and third switchable current source, each coupled to a respective first, second and third logical switch, where the logical switches are coupled to the temperature sensing element; a mid-range voltage logic, operative to maintain a third voltage output from the temperature sensing element. The integrated circuit may also include a difference amplifier followed by an ADC. The first, second and third voltage outputs are generated by connection of the corresponding first, second and third switched current sources. The current sources are sequentially switched to produce a corresponding respective first, second and third excitation current through the temperature sensing element. The mid-range voltage logic uses the third voltage output as a reference voltage between the first voltage and the second voltage.

The ADC with embedded logic may then calculate an error corrected difference between the first voltage and the second voltage using the reference voltage. The error corrected difference is used by additional logic for generating temperature data that is provided to a temperature controller for preventing heat damage to the integrated circuit. For the integrated circuit temperature sensing device disclosed, the second switchable current source may be sized such that the second excitation current is proportional to the first excitation current, from the first switchable current source, by a value n, and the third switchable current source is sized such that the third excitation current is proportional to the first excitation current by the square root of n.

A computer readable medium is also disclosed for storing executable instructions for execution by at least one processor, that when executed cause the at least one processor to cause operation of a group of logical switches to generate a first, second and third voltage outputs from a temperature sensing element of an integrated circuit using a corresponding first, second and third switched current source. The current sources are sequentially switched, using the group of logical switches, to produce a respective first, second and third excitation current through the temperature sensing element. The third switched current source generates the corresponding third voltage output that is maintained and used as a reference voltage between the first voltage and the second voltage; and error corrected difference is calculated between the first voltage and the second voltage using the reference voltage.

Turning now to the drawings wherein like numerals designate like components, FIG. 1 is a previous apparatus for temperature detection as was discussed previously. A group of logical switches are appropriately clocked to close in a sequence such that the voltage across diode D1, as measured at node 105, is stored by a corresponding capacitor, C1 or C2, thereby achieving a sample-and hold methodology. This approach suffers from various deficiencies as was discussed previously.

Figure 2:
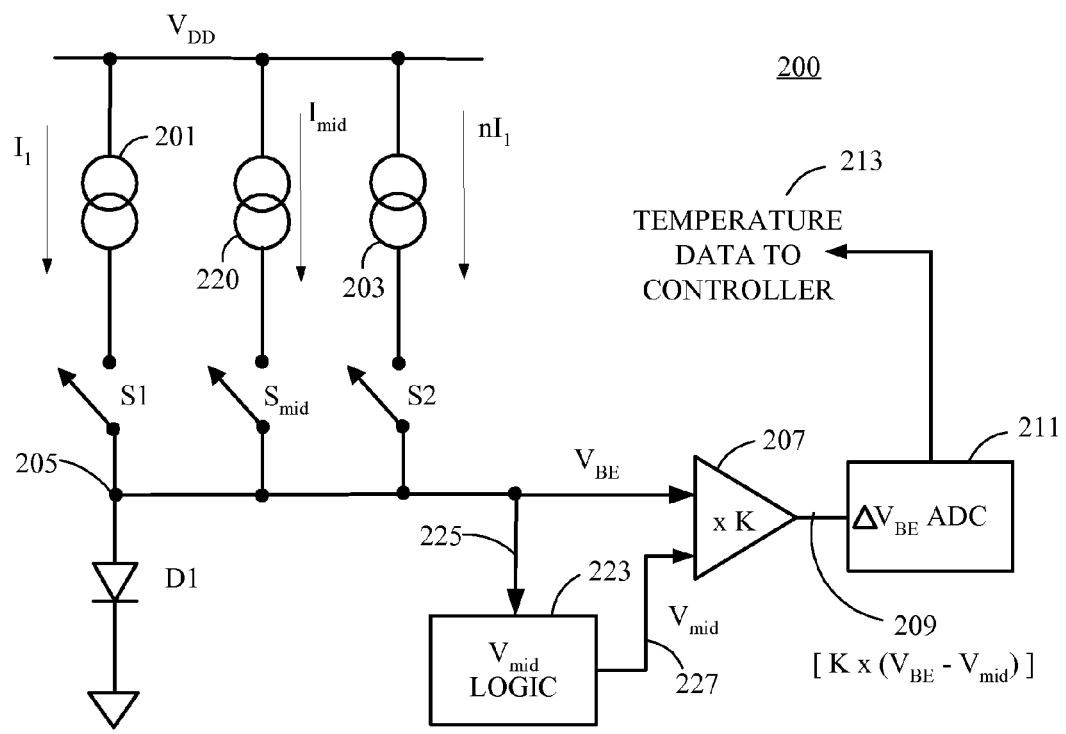
FIG. 2 is a schematic diagram of a system for monitoring temperature levels for block level areas of a chip, in accordance with the embodiment.

Turning now to FIG. 2, an embodiment having a single diode D1 is illustrated for the purpose of explaining the principles related to the methods and apparatuses disclosed herein. In accordance with the illustrated embodiment, a middle range current, $I_{mid}$, is generated by current source 220 and is employed in conjunction with logical switch $S_{mid}$, such that the current $I_{mid}$ may pass through the diode D1.

Figure 3:
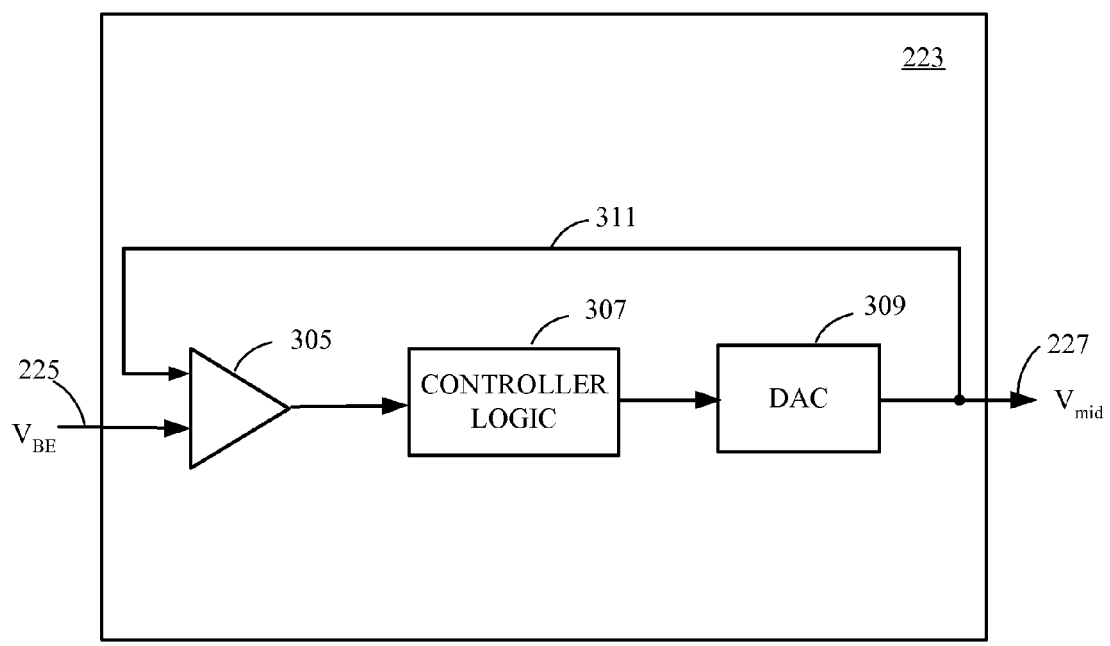
FIG. 3 is a block diagram of a controller logic in accordance with the embodiments.
Figure 4:
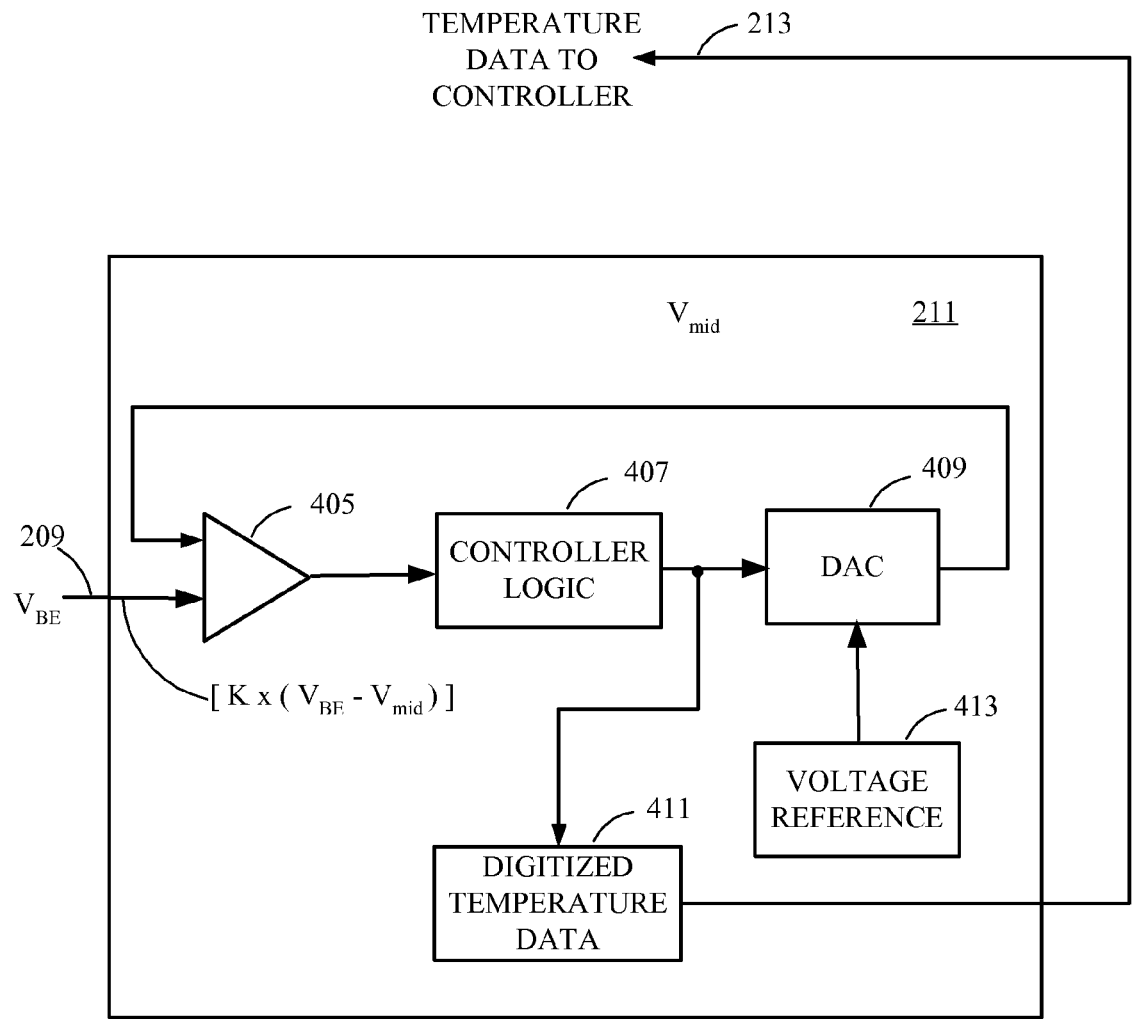
FIG. 4 is a block diagram showing further details of a controller logic in accordance with the embodiments.

A controller logic, Vmid logic 223, maintains and provides a Vmid voltage output 227, which is a mid-range reference voltage, to a differential amplifier 207. FIG. 3 provides additional details of the Vmid logic 223. The term "logic" as used herein includes hardwire logic, but is not so limited, and may also include software and/or firmware executing on one or more programmable processors, ASICs, or combinations thereof. Although the logic herein described may be located on-die, that is, located on the same physical chip that is being monitored for temperature, the embodiments are not so limited, and the logic may be located off-die in some embodiments. However the temperature sensing elements will be located on-die, near the locations to be monitored, that is, the chip areas of interest for monitoring heating conditions. Further any software that may be required for some embodiments may be stored on a computer readable medium such as, but not limited to, a CD, DVD, or other non-volatile memory that may provide code to be loaded to, and/or executed by, one or more programmable processors.

As shown in FIG. 2, when the logical switch Smid is in a closed position, the Vmid logic 223 receives as an input Vbe (base to emitter voltage) 225 from the diode D1 which is the temperature sensing element. As understood by one of ordinary skill, the diode D1 may be a circuit utilizing, for example, a transistor, such as a parasitic vertical PNP bipolar junction transistor as may be used in CMOS processes. However the diode D1 may be a PN junction diode, a diode-connected bipolar junction transistor, a diode-connected FET, or any other suitable circuit for providing temperature related indications.

In FIG. 3, the $V_{mid}$ logic 223 is shown including a comparator 305 for receiving the voltage input 225, which is the voltage $V_{BE}$ from the diode D1 when logical switch Smid is in a closed position. A controller logic 307 is operative to gradually adjust a digital-to-analog converter (DAC) 309 output 227, Vmid, to be close to the incoming VBE by employing a feedback loop 311. The feedback loop 311 feeds the voltage output 227 back to the comparator 305, which thereby accounts for the quantizing error "ϵ," caused by the digitization of the input. The output voltage 227, Vmid, is therefore defined by the current Imid, and thus serves as a reference for varying levels of VBE, that is, higher or lower VBE measurements. In accordance with the embodiments, the controller logic 307 may also include digital noise filtering such that the output 227 is less influenced by noise. The controller logic 307 will then store, in other words, maintain, the determined final Vmid digital representation for the in-progress temperature measurement.

The two current sources 201 and 203 define the current values $I_1$ and $nI_1$, respectively, as shown in FIG. 2. Regarding the current source 220, for the various embodiments, the recommended value for $I_{mid}$ from current source 220 is $I_1 \sqrt{n}$. In this case the voltage $V_{mid}$ will fall between the $V_{BE}$ levels, exactly at the midpoint, that result from current source 201 ($I_1$) and current source 203 ($nI_1$), and will maintain this mid-range position as the measured temperature varies. Although this setting is not a requirement of the embodiments, it is recommended in that it is helpful toward keeping the amplifier 207 out of saturation and improving its, and also the ADC's, dynamic range.

In accordance with the embodiments, an appropriate clock signal, or clock signals, may then be applied to cause logical switch $S_{mid}$ to open, and logical switch S1 to close such that current $I_1$, from current source 201, flows through diode D1. Amplifier 207 will then magnify the difference voltage, that is, the output voltage 209 will be equal to $[K \times (V_{BE}$ (from $I_1) - V_{mid})]$. This voltage, in analog form, is then provided to the $\Delta V_{BE}$ ADC 211.

Because the differential amplifier 207 will have an offset the output voltage 209 is more precisely defined as $[K \times (V_{BE}$ (from $I_1) - V_{mid} + V_{offset}) + \epsilon]$, where "$\epsilon$" is a digital quantization error. As noted previously, some embodiments, may also include digital noise filtering such that the voltage input to amplifier 207 and output 227 are less influenced by noise. The $\Delta V_{BE}$ ADC 211 controller logic 407 will then store the determined $\Delta V_{BE}$ (from $I_1$), which is equal to $[K \times (V_{BE}$ (from $I_1) - V_{mid} + V_{offset}) + \epsilon]$, in digital form for the in-progress temperature measurement.

The appropriate clock signal, or clock signals, may then be applied to cause logical switch S1 to open, and logical switch S2 to close such that current $nI_1$, from current source 203, flows through diode D1. The amplifier 207 will then magnify the difference voltage, that is, the output voltage 209 will be equal to $[K \times (V_{BE}$ (from $nI_1) - V_{mid})]$, and this voltage, in analog form, is then provided to the $\Delta V_{BE}$ ADC 211. Similar to that noted above for the $I_1$ case, the output voltage 209 is more precisely defined as $[K \times (V_{BE}$ (from $nI_1) - V_{mid} + V_{offset}) + \epsilon]$, where "$\epsilon$" is again the digital quantization error. Digital noise filtering may again be applicable to reduce the noise dependency of the inputs and outputs. The $\Delta V_{BE}$ ADC 211 controller logic 407 will then store the determined final $V_{BE}$ (from $nI_1$) which is equal to $[K \times (V_{BE}$ (from $nI_1) - V_{mid} + V_{offset}) + \epsilon]$, in digital form for the in-progress temperature measurement.

The $\Delta V_{BE}$ digital value determined based on $I_1$ is then subtracted from the $\Delta V_{BE}$ digital value determined based on $nI_1$ in the digital domain while accounting for the amplifier offset and quantization error. This appears in the analog domain as: $[K \times (V_{BE}$ (from $nI_1) - V_{mid} + V_{offset}) + \epsilon] - [K \times (V_{BE}$ (from $I_1) - V_{mid} + V_{offset}) + \epsilon]) = K \times (V_{BE}$ (from $nI_1) - (V_{BE}$ (from $I_1$)). This operation may be performed by the $\Delta V_{BE}$ ADC 211, controller logic 407.

Digitized temperature data logic 411 then creates a digital temperature data output 213 for a temperature controller, such as, but not limited to, a fan controller circuit, etc. The temperature is determined where:

$K \times (V_{BE}$ (from $nI_1) - (V_{BE}$ (from $I_1)) = K \cdot kT/q \times \ln(nI_1/I_1) = K \cdot kT/q \times \ln(n) = M \times T$; where: "K" is the amplification gain, "k" is Boltzmann's constant $1.381 \times 10^{-23}$ Joules/Kelvin, "T" is temperature in degrees Kelvin, q is the electronic charge value $1.602 \times 10^{-19}$, and "M" is defined as the coefficient thus formed by $K \cdot k/q \times \ln(n)$.

FIG. 5 provides description of a method of operation in accordance with the embodiments, as related to the description provide above. In 501, a low, high and mid-range voltage are generated from a temperature sensing element such as diode D1, and measured as was described above. The mid-range voltage is between the low and high voltages and is maintained for in-progress temperature measurements. In 503, the mid-range voltage is subtracted from the high voltage, and from the low voltage, to obtain an adjusted high voltage and an adjusted low voltage. In 505, the adjusted high and low voltages are amplified, and in 507 the adjusted voltages are used to produce digitized temperature data. FIG. 6 provides additional details with respect to FIG. 5. For example, in 601, an amplifier offset correction may be applied. Similarly in 603, a digital quantization error correction may be applied. In 605, the determined digital temperature data, having the amplifier offset and quantization error corrections, may then be provided to a temperature controller.

Figure 7:
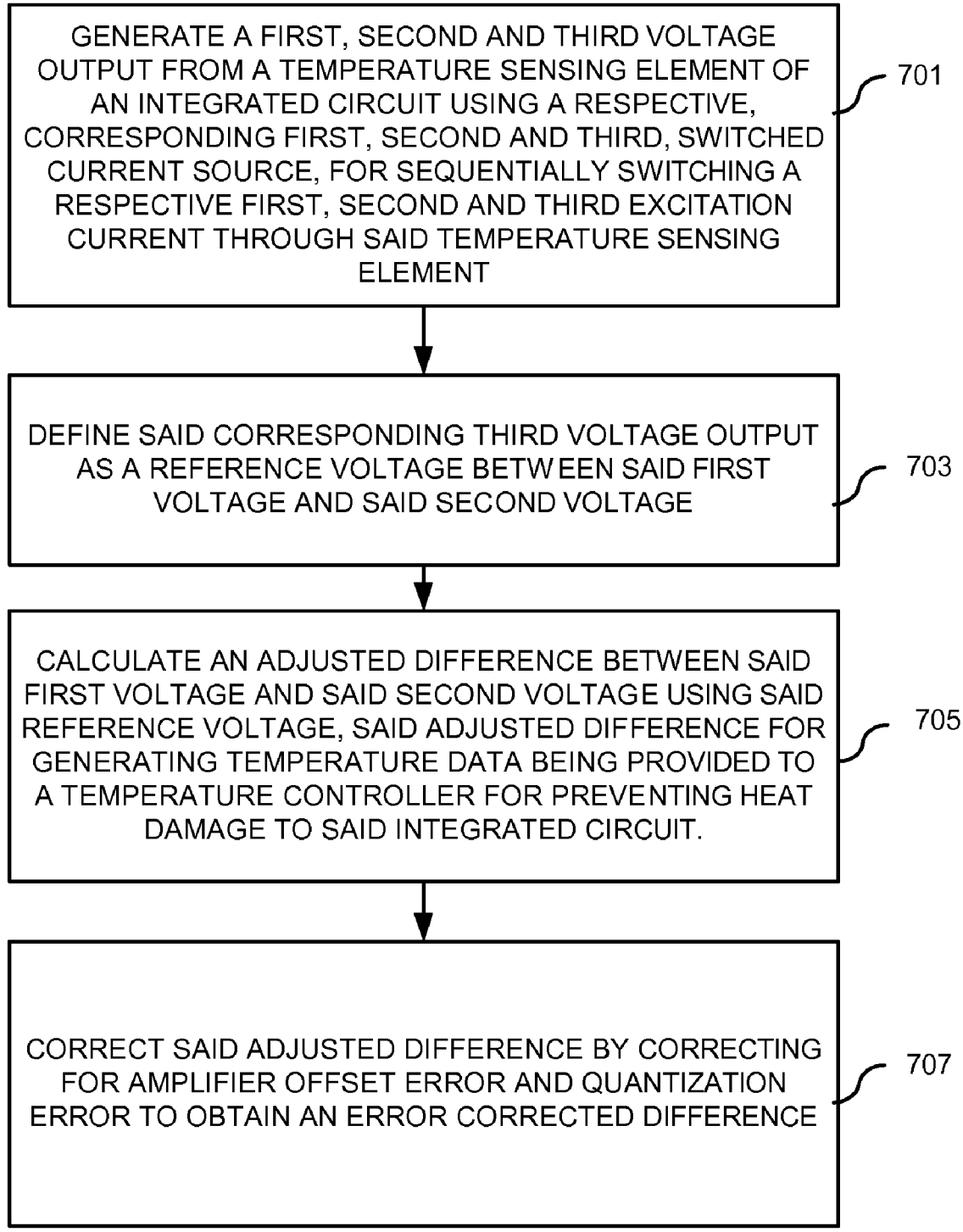
FIG. 7 is a flow chart of a method in accordance with the embodiments.

FIG. 7 also provides a method of operation of the embodiments. In 701, the method generates a first, second and third voltage output from a temperature sensing element of an integrated circuit using a respective, corresponding first, second and third, switched current source, for sequentially switching a respective first, second and third excitation current through the temperature sensing element. The corresponding third voltage output is defined as a reference voltage between the first voltage and said second voltages as shown in 703. In 705, the method includes calculating an adjusted difference between the first voltage and the second voltage using the reference voltage. The adjusted difference is used for generating temperature data which is provided to a temperature controller for preventing heat damage to the integrated circuit. Correction of the adjusted difference may be also be performed as shown in 707, by correcting for amplifier offset error and quantization error to obtain an error corrected difference.

The various embodiments therefore provide methods and apparatuses for determining a relationship between the digital representation of $\Delta V_{BE}$ (from $nI_1$ and $I_1\sqrt{n}$)$-\Delta V_{BE}$ (from $I_1$ and $I_1\sqrt{n}$), and analog temperature values such that the resulting information may be used by digital processing logic to take appropriate actions (such as, but not limited to switching to low clock speeds, lowering voltage supply levels, increasing fan rotation, shutting down over-heated blocks, etc) in order to prevent chip damage from overheating. The various embodiments herein disclosed impose no limit as to how many thermo-sensors may be used. Therefore, by placing a single diode, or any other appropriate temperature sensing device, in any high activity local area of the chip as desired enables monitoring of temperature data for that specific area. Further, the various embodiments may utilize external thermo-sensors, such as diodes, as desired. The same methodology and solution will help monitoring external devices temperature.

Therefore various equivalents of the embodiments described in detail herein are contemplated in accordance with the disclosure provided herein. Therefore, other variations that would be equivalent to the herein disclosed embodiments may occur to those of ordinary skill in the art and would remain in accordance with the spirit and scope of the embodiments as defined herein by the following claims:

What is claimed is:

1. A method comprising:
    subtracting a measured first voltage from measured second and third voltages to obtain adjusted second and third voltages, said measured voltages measured using a voltage drop across a temperature sensing element of an integrated circuit and wherein the first voltage is maintained at a level between the second and third measured voltage; and using a difference between said adjusted second and third voltages to produce digitized temperature data.

2. The method of claim 1, further comprising:
generating said second, third and first voltages by injecting a corresponding second, third and first excitation current through said temperature sensing element, wherein said third excitation current is proportional to said second excitation current by a value n, wherein n>0, and wherein said first excitation current is proportional to said second excitation current by the square root of n.

3. A method comprising:
generating a first, second and third voltage output from a temperature sensing element of an integrated circuit using a respective, corresponding first, second and third, switched current source, for sequentially switching a respective first, second and third excitation current through said temperature sensing element, wherein said third switched current source generates said corresponding third voltage output as a reference voltage between said first voltage and said second voltage; and
calculating an error corrected difference between said first voltage and said second voltage using said reference voltage, said error corrected difference for generating temperature data being provided to a temperature controller for preventing heat damage to said integrated circuit.

4. The method of claim 3, wherein said second excitation current is proportional to said first excitation current by a value n, wherein n>0, and wherein said third excitation current is proportional to said first excitation current by the square root of n.

5. The method of claim 3, wherein calculating an error corrected difference, comprises:
subtracting said reference voltage from said first voltage and from said second voltage.

6. The method of claim 3, wherein calculating an error corrected difference, comprises:
calculating said reference voltage using a feedback loop, feeding back a digital-to-analog converter output to a comparator for comparing the output with said third voltage.

7. The method of claim 3, further comprising:
calculating said temperature data including using a feedback loop, feeding back a digital-to-analog converter output to a comparator for comparing the output with an amplified difference between either said first voltage and said third voltage or said second voltage and said third voltage.

8. An integrated circuit temperature sensing device comprising:
at least one temperature sensing element positioned in an area of said integrated circuit;
a first switchable current source, coupled to a first logical switch that is coupled to said at least one temperature sensing element and operative to switch a first excitation current from said first switchable current source through said at least one temperature sensing element to produce a first voltage output therefrom;
a second switchable current source, coupled to a second logical switch that is coupled to said at least one temperature sensing element and operative to switch a second excitation current from said second switchable current source through said temperature sensing element to produce a second voltage output therefrom;
a third switchable current source, coupled to a third logical switch that is coupled to said at least one temperature sensing element and operative to switch a third excitation current from said third switchable current source through said at least one temperature sensing element to produce a third voltage output therefrom; and
a mid-range voltage logic coupled to said at least one temperature sensing element, said mid-range voltage logic being operative to:
measure said third voltage output from said at least one temperature sensing element, wherein said mid-range voltage logic uses said third voltage output as a reference voltage between said first voltage and said second voltage.

9. The integrated circuit temperature sensing device of claim 8, wherein said mid-range voltage logic is further operative to:
calculate an error corrected difference between said first voltage and said second voltage using said reference voltage, said error corrected difference for generating temperature data being provided to a temperature controller for preventing heat damage to said integrated circuit.

10. The integrated circuit temperature sensing device of claim 9, wherein said mid-range voltage logic is further operative to:
calculate said error corrected difference by subtracting said reference voltage from said first voltage and from said second voltage.

11. The integrated circuit temperature sensing device of claim 9, wherein said mid-range voltage logic comprises:
a comparator having one input operative to receive said first, second or third voltages from said at least one temperature sensing element, and having a second input operative to receive feedback;
a digital-to-analog converter coupled to said comparator second input and operative to provide said feedback thereto;
a controller logic coupled to said comparator and operative to receive said comparator's output as an input, and coupled to said digital-to-analog converter and operative to provide an input thereto, and further operative to provide said reference voltage as an output.

12. The integrated circuit temperature sensing device of claim 11, further comprising:
a differential amplifier coupled to said mid-range voltage logic and to said at least one temperature sensing element, said differential amplifier operative to receive said first voltage, said second voltage and said third voltage from said at least one temperature sensing element, and operative to receive said reference voltage from said mid-range voltage logic.

13. The integrated circuit temperature sensing device of claim 12, further comprising:
a delta-VBE logic coupled to said differential amplifier and operative to receive an input therefrom.

14. The integrated circuit temperature sensing device of claim 13, wherein said delta-VBE logic comprises:
a delta-VBE comparator having one input from said differential amplifier, and having a second input operative to receive feedback;
a digital-to-analog converter coupled to said delta-VBE comparator second input and operative to provide said feedback thereto;
a controller logic coupled to said delta-VBE comparator and operative to receive said delta-VBE comparator's output as an input, and coupled to said digital-to-analog converter and operative to provide an input thereto, and further operative to provide an error corrected difference as an input to a digitized temperature logic, for conversion to digital temperature data.

15. The integrated circuit temperature sensing device of claim 14, wherein said delta-VBE logic comprises:
said digitized temperature logic, wherein said digitized temperature logic includes stored temperature data corresponding to said temperature sensing element voltages such that said conversion to digital temperature data includes performing a lookup of said stored temperature data corresponding to a received voltage measurement from said temperature sensing element.

16. The integrated circuit temperature sensing device of claim 13, wherein said delta-VBE logic is further operative to calculate said error corrected difference between said first voltage and said second voltage using said reference voltage, by subtracting said reference voltage from said first voltage to obtain an adjusted first voltage, subtracting said reference voltage from said second voltage to obtain an adjusted second voltage, and subtracting said adjusted first voltage from said adjusted second voltage.

17. The integrated circuit temperature sensing device of claim 8, wherein said second switchable current source is sized such that said second excitation current is proportional to said first excitation current, from said first switchable current source, by a value n, and wherein said third switchable current source is sized such that said third excitation current is proportional to said first excitation current by the square root of n.

18. An integrated circuit comprising the integrated circuit temperature sensing device of claim 8.

19. A non-transitory computer readable medium comprising: executable instructions for execution by at least one processor, that when executed cause the at least one processor to:
cause operation of a group of logical switches to generate a first, second and third voltage output from a temperature sensing element of an integrated circuit using a corresponding first switched current source, a corresponding second switched current source, and a corresponding third switched current source, by sequentially switching, using said group of logical switches, a respective first, second and third excitation current through said temperature sensing element, wherein said third switched current source generates said corresponding third voltage output as a reference voltage between said first voltage and said second voltage; and
calculate an error corrected difference between said first voltage and said second voltage using said reference voltage, said error corrected difference for generating temperature data being provided to a temperature controller for preventing heat damage to said integrated circuit.

20. The non-transitory computer readable medium of claim 19, wherein said executable, instructions, when executed, further cause said at least one processor to:
calculate the error corrected difference by subtracting said reference voltage from said first voltage and from said second voltage.

* * * * *